(12) United States Patent
McCown et al.

(10) Patent No.: US 12,210,597 B1
(45) Date of Patent: Jan. 28, 2025

(54) APPARATUS AND METHOD FOR CROSS-DOMAIN DIGITAL VERIFIABLE CREDENTIAL EXCHANGE

(71) Applicant: Anonyome Labs, Inc., Salt Lake City, UT (US)

(72) Inventors: Steven Harvey McCown, Mapleton, UT (US); Paul Ashley, Toowong (AU); John David Mumford, Portola Valley, CA (US)

(73) Assignee: Anonyome Labs, Inc., Salt Lake City, UT (US)

( * ) Notice: Subject to any disclaimer, the term of this patent is extended or adjusted under 35 U.S.C. 154(b) by 0 days.

(21) Appl. No.: 18/784,090

(22) Filed: Jul. 25, 2024

Related U.S. Application Data (60) Provisional application No. 63/644,402, filed on May 8, 2024.

(51) Int. Cl.
*G06F 21/31* (2013.01)

(52) U.S. Cl.
CPC .................................... *G06F 21/31* (2013.01)

(58) Field of Classification Search
CPC ....................................................... G06F 21/31
See application file for complete search history.

(56) References Cited

U.S. PATENT DOCUMENTS

| | | | | |
|---|---|---|---|---|
| 6,996,718 | B1 * | 2/2006 | Henry | G06F 21/41 |
| | | | | 713/184 |
| 8,307,003 | B1 * | 11/2012 | Sheth | G06F 16/958 |
| | | | | 707/790 |
| 9,424,419 | B1 * | 8/2016 | Kruse | G06F 21/31 |
| 9,594,922 | B1 * | 3/2017 | McGuire | H04L 9/08 |
| 9,600,656 | B1 * | 3/2017 | Wellinghoff | G06F 21/45 |
| 9,721,147 | B1 * | 8/2017 | Kapczynski | G06Q 50/265 |
| 10,044,695 | B1 * | 8/2018 | Cahill | G06F 21/44 |
| 10,248,798 | B1 * | 4/2019 | Jayakumar | G06F 21/608 |
| 10,275,736 | B1 * | 4/2019 | Annam | G06Q 10/087 |
| 10,331,695 | B1 * | 6/2019 | Stickle | G06F 16/27 |
| 10,402,549 | B1 * | 9/2019 | Newstadt | G06F 21/45 |
| 10,554,411 | B1 * | 2/2020 | Ashfield | H04L 9/3242 |
| 10,628,217 | B1 * | 4/2020 | Liverance | G06F 9/46 |
| 10,715,507 | B1 * | 7/2020 | Spears | G06Q 20/405 |
| 10,740,778 | B1 * | 8/2020 | Nair | G06Q 30/0222 |
| 11,037,088 | B1 * | 6/2021 | Woo | G06Q 10/083 |
| 11,443,180 | B1 * | 9/2022 | Boteanu | G06Q 30/0631 |
| 11,880,836 | B1 * | 1/2024 | Nemethi | H04L 9/3213 |

(Continued)

*Primary Examiner* — Aravind K Moorthy
(74) *Attorney, Agent, or Firm* — Cooley LLP (57) ABSTRACT

A non-transitory computer readable storage medium has instructions executed by a processor to host a digital verified credential exchange in network communication with different verified credential operating environments. The digital verified credential exchange has a verified credential exchange engine in network communication with user and system interfaces for interacting with a verified credential holder machine, a credential database, a verified credential operating environment operating attributes database, an exchanged verified credential database, and an exchanged verified credential status monitor. The digital verified credential exchange automatically forms a reissued digital verified credential from a first verified credential operating environment for execution in a second verified credential operating environment.

11 Claims, 9 Drawing Sheets

(56) References Cited

U.S. PATENT DOCUMENTS

| | | | |
|---|---|---|---|
| 11,997,108 B1* | 5/2024 | Begando | H04L 9/3239 |
| 2002/0169967 A1* | 11/2002 | Varma | H04L 63/0853 |
| | | | 713/185 |
| 2005/0228722 A1* | 10/2005 | Embree | G06Q 30/02 |
| | | | 705/347 |
| 2006/0242027 A1* | 10/2006 | Falic | G06Q 30/0635 |
| | | | 705/26.81 |
| 2008/0209224 A1* | 8/2008 | Lord | H04L 63/0869 |
| | | | 713/185 |
| 2010/0096933 A1* | 4/2010 | Smith | H02J 3/007 |
| | | | 307/86 |
| 2010/0199336 A1* | 8/2010 | Tan | H04L 9/3228 |
| | | | 726/6 |
| 2010/0251242 A1* | 9/2010 | Sivasubramanian | |
| | | | G06F 11/3006 |
| | | | 718/100 |
| 2011/0173684 A1* | 7/2011 | Hurry | G06F 21/34 |
| | | | 726/6 |
| 2011/0314522 A1* | 12/2011 | Palanigounder | H04B 7/155 |
| | | | 726/4 |
| 2012/0072976 A1* | 3/2012 | Patil | H04W 12/069 |
| | | | 726/5 |
| 2012/0303491 A1* | 11/2012 | Hill | G06Q 30/0601 |
| | | | 705/27.2 |
| 2013/0268561 A1* | 10/2013 | Christie | G06F 16/2246 |
| | | | 707/777 |
| 2016/0241559 A1* | 8/2016 | Trani | H04W 12/08 |
| 2016/0328796 A1* | 11/2016 | Acuña-Rohter | G06Q 40/04 |
| 2016/0343049 A1* | 11/2016 | Nair | G06Q 30/0601 |
| 2016/0359633 A1* | 12/2016 | Norton | H04L 9/30 |
| 2017/0011214 A1* | 1/2017 | Cavanagh | H04L 63/0846 |
| 2018/0068380 A1* | 3/2018 | Srinivasan | G06F 3/0482 |
| 2018/0097793 A1* | 4/2018 | Agarwal | H04W 12/068 |
| 2018/0183786 A1* | 6/2018 | Tardif | H04L 63/083 |
| 2018/0278624 A1* | 9/2018 | Kuperman | H04L 9/3271 |
| 2019/0044740 A1* | 2/2019 | Smith | H04W 12/009 |
| 2019/0102819 A1* | 4/2019 | Bilotta | G16H 10/60 |
| 2019/0122243 A1* | 4/2019 | Mizzone | G06Q 50/01 |
| 2019/0158487 A1* | 5/2019 | Hayes | H04L 63/0861 |
| 2019/0319938 A1* | 10/2019 | Castinado | H04L 9/0637 |
| 2020/0057848 A1* | 2/2020 | Hecht | H04L 63/1425 |
| 2020/0058021 A1* | 2/2020 | Mittal | G06Q 20/3829 |
| 2020/0065484 A1* | 2/2020 | Gordon | G06F 21/604 |
| 2020/0082392 A1* | 3/2020 | Pishevar | G06Q 20/20 |
| 2020/0126102 A1* | 4/2020 | Bellrose | G06Q 30/0226 |
| 2020/0151423 A1* | 5/2020 | Fox | G06V 40/161 |
| 2020/0202336 A1* | 6/2020 | Walters | G07G 1/01 |
| 2020/0220791 A1* | 7/2020 | Aiello | G06F 9/455 |
| 2020/0250287 A1* | 8/2020 | Singh | H04L 9/3231 |
| 2020/0279312 A1* | 9/2020 | Salameh | G06Q 30/0621 |
| 2020/0358787 A1* | 11/2020 | Barker | H04L 63/123 |
| 2020/0394183 A1* | 12/2020 | Jois | G06F 16/9024 |
| 2020/0410556 A1* | 12/2020 | Kulkarni | G06Q 30/0619 |
| 2021/0182806 A1* | 6/2021 | Ornelas | G06Q 20/3678 |
| 2021/0201278 A1* | 7/2021 | Annamalai | G06Q 20/108 |
| 2021/0295431 A1* | 9/2021 | Vo | G06Q 10/10 |
| 2021/0314331 A1* | 10/2021 | Singh | H04L 9/0891 |
| 2021/0374650 A1* | 12/2021 | Lee | G06Q 10/063112 |
| 2022/0043902 A1* | 2/2022 | Olson | H04L 9/30 |
| 2022/0051246 A1* | 2/2022 | Barski | G06Q 30/0609 |
| 2022/0054936 A1* | 2/2022 | Salik | A63F 13/67 |
| 2022/0058633 A1* | 2/2022 | Yantis | G06Q 20/4016 |
| 2022/0122100 A1* | 4/2022 | Smith | G06F 16/953 |
| 2022/0188818 A1* | 6/2022 | Roche | G06Q 50/18 |
| 2022/0188958 A1* | 6/2022 | Vasudevan | G06Q 30/0631 |
| 2022/0239483 A1* | 7/2022 | Sugarev | H04L 9/3242 |
| 2022/0255745 A1* | 8/2022 | Tiffany | G06F 21/31 |
| 2022/0276996 A1* | 9/2022 | Gaur | G06Q 20/401 |
| 2022/0286446 A1* | 9/2022 | Hecht | H04L 63/0435 |
| 2022/0318418 A1* | 10/2022 | Goel | G06F 16/215 |
| 2022/0335110 A1* | 10/2022 | Isaacs | G06F 21/31 |
| 2022/0350496 A1* | 11/2022 | Mangaly | G06F 3/0622 |
| 2022/0351170 A1* | 11/2022 | Storiale | G06Q 20/4016 |
| 2022/0370778 A1* | 11/2022 | Azdoud | G06F 21/16 |
| 2022/0391961 A1* | 12/2022 | Gupta | G06Q 30/0631 |
| 2022/0414650 A1* | 12/2022 | Wotherspoon | G06Q 20/382 |
| 2023/0020703 A1* | 1/2023 | Padinjaruveetil | H04L 9/3226 |
| 2023/0043398 A1* | 2/2023 | Yaplee | G06Q 30/06 |
| 2023/0065042 A1* | 3/2023 | Li | G06Q 40/06 |
| 2023/0080322 A1* | 3/2023 | Smith | H04L 63/123 |
| | | | 726/7 |
| 2023/0087841 A1* | 3/2023 | Read | H04L 9/3247 |
| | | | 705/51 |
| 2023/0245231 A1* | 8/2023 | Teissier | G06Q 50/167 |
| | | | 705/36 R |
| 2023/0251876 A1* | 8/2023 | Mysore Jagadeesh | |
| | | | G06F 9/4401 |
| | | | 713/2 |
| 2023/0274244 A1* | 8/2023 | Quigley | G06F 21/602 |
| | | | 705/65 |
| 2023/0356091 A1* | 11/2023 | Eisenberg | A63F 13/79 |
| 2023/0377056 A1* | 11/2023 | Yang | A63F 13/67 |
| 2023/0401597 A1* | 12/2023 | Mayer | G06Q 30/0273 |
| 2023/0409357 A1* | 12/2023 | He | G06F 9/45558 |
| 2024/0037206 A1* | 2/2024 | Ramaiah | H04L 63/04 |
| 2024/0062621 A1* | 2/2024 | Hufnagl-Abraham | |
| | | | G07F 17/3225 |
| 2024/0089104 A1* | 3/2024 | Reineke | H04L 9/50 |
| 2024/0098323 A1* | 3/2024 | Biggs | H04N 21/25891 |
| 2024/0100444 A1* | 3/2024 | Samarthyam | G06Q 10/1053 |
| 2024/0135402 A1* | 4/2024 | Cascio | G06Q 30/0631 |
| 2024/0144324 A1* | 5/2024 | deGrandis | G06Q 30/02 |
| 2024/0171393 A1* | 5/2024 | Bathen | H04L 9/30 |
| 2024/0235191 A1* | 7/2024 | Papadopoulos | H02J 3/003 |
| 2024/0256643 A1* | 8/2024 | Burström | G06F 21/604 |
| 2024/0257211 A1* | 8/2024 | Bathe | G06Q 30/0631 |
| 2024/0261692 A1* | 8/2024 | Sliwka | H04L 9/3213 |
| 2024/0275596 A1* | 8/2024 | Stolbikov | H04L 9/3213 |
| 2024/0281865 A1* | 8/2024 | Zubcevic | G06Q 30/0631 |
| 2024/0348608 A1* | 10/2024 | Howell | H04L 63/0884 |
| 2024/0370865 A1* | 11/2024 | Bernardi | G06Q 20/389 |
| 2024/0370916 A1* | 11/2024 | Talma | G06Q 30/0633 |
| 2024/0378600 A1* | 11/2024 | Maurya | G06Q 20/3825 |

* cited by examiner

Holder Proof Response Packet

```
{
"id": "1234567890",
"type": "<EVC Proof Response>",
"sender": "sender ID",
"recipient": "recipient ID",
"sent_time": "1713902678",
"body": {
"proof_response_data": "<proof_response_data>"
"required": true
},
"digital_signature": "<signature data>"
}
```

FIG. 10

VCE EVC Issue Packet

```
{
"id": "1234567890",
"type": "<EVC Issue>",
"sender": "sender ID",
"recipient": "recipient ID",
"sent_time": "1713920987",
"body": {
"query": [
{
"type": "<evc_type>",
"evc_data": "[<evc_data_elements>"],
"required": true
}
],
"digital_signature": "<signature data>"
}
```

FIG. 11

APPARATUS AND METHOD FOR CROSS-DOMAIN DIGITAL VERIFIABLE CREDENTIAL EXCHANGE

CROSS-REFERENCE TO RELATED APPLICATION

This application claims priority to U.S. Provisional Patent Application 63/644,402, filed May 8, 2024, the contents of which are incorporated herein by reference.

FIELD OF THE INVENTION

This application relates to digital communications in a network environment. More particularly, this application discloses techniques for a cross-domain digital verifiable credential exchange.

BACKGROUND OF THE INVENTION

As credential verification systems evolve from paper-based credentials and simple digital tokens (often accessed with usernames and passwords), Verifiable Credentials (VC) are emerging as the leader of secure digital tokens. As with any emerging technology, there are many different credential types and formats.

From the diverse set of emerging VC formats, there will at some point be a consolidation into a finite subset of formats and standards. However, this number will probably never reduce to a single format. It is also unlikely that all VC verifiers will support all formats. This leaves users in a predicament.

As digital identity becomes more widely adopted and the number and types of verifiable credentials increases, a new type of compatibility process is required. There is a need for techniques that enable a VC of one type to be presented, verified, and used to request a credential of another type.

This paradigm would enable, for example, a visitor possessing a VC from a home country to present it for identity verification upon entry into a foreign country and receive a visitor pass credential (e.g., as a VC) that complies with the rules, regulations, governance model, and credential type stipulated by the foreign country's governing authority. This process serves many purposes, including identity verification upon immigration and issuance of a locally accepted VC. By receiving a visitor VC in the local format, visitors and immigrants will have a much easier time using their VCs with merchants, hotels, hospitals, etc. without having to explain the format of their home country's VC or why their VC technology may not work locally. Those skilled in the art will understand that numerous additional use cases are enabled by this more general process.

Figure 1:
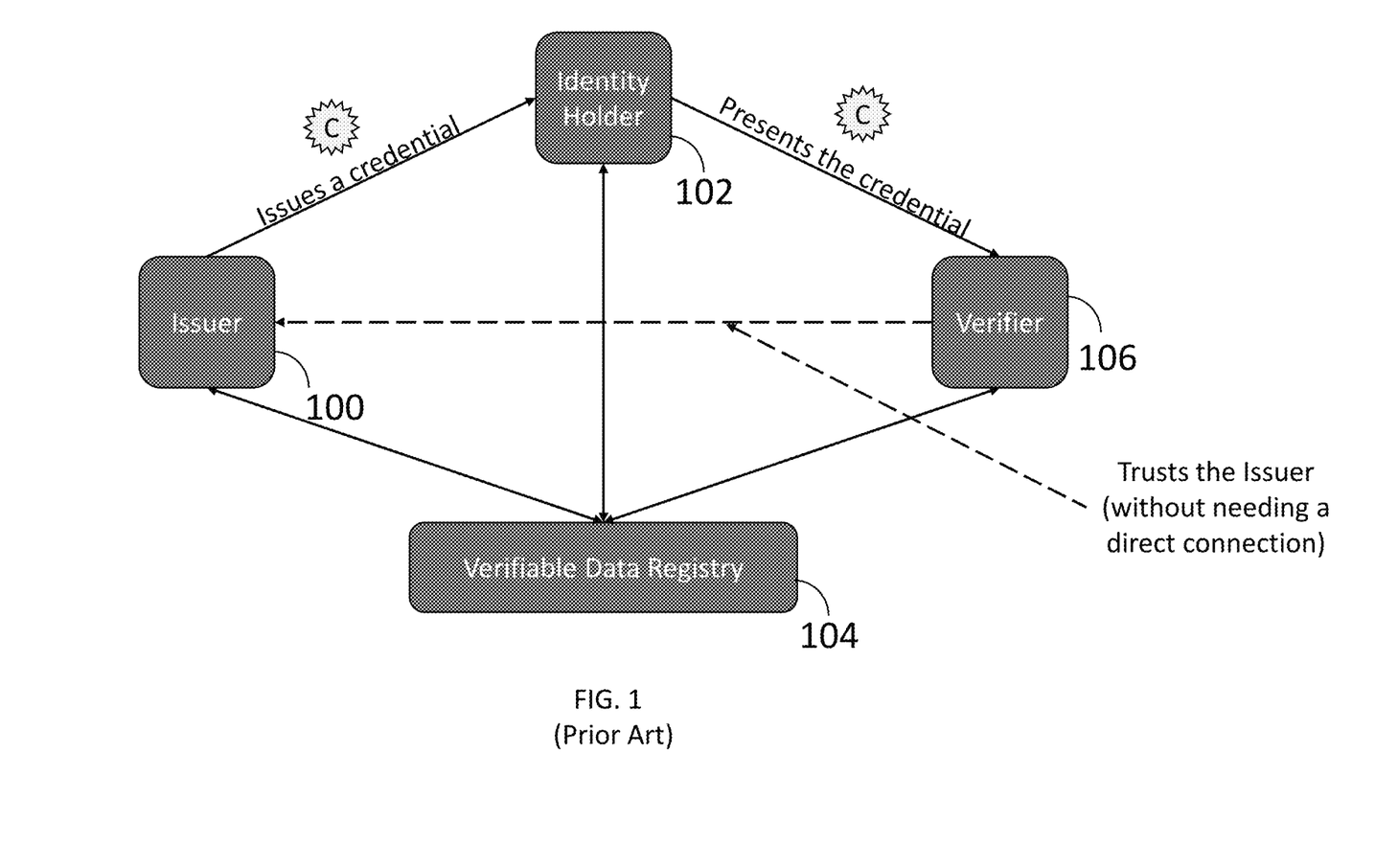
FIG. 1 illustrates the known decentralized identity trust diamond.

The known Decentralized Identity Trust Diamond is characterized in FIG. 1.

Issuer 100: generates and issues VCs upon requests from an Identity Holder 102. Issuer identity is anchored on a Verifiable Data Registry (VDR) 104.

Identity Holder (Holder) 102: receives and stores VCs in a data store that they control (e.g., digital wallet). Holder 102 creates VC Presentations to present to Verifiers. The Holder identity may be anchored to a VDR 104.

Verifier 106: verifies VC presentations received from Holder 102. Verifier Identity may be anchored to a VDR 104.

Verifiable Data Registry (VDR) 104: a protected data store or storage mechanism that is often immutable (e.g., blockchain, ledger) that provides a trusted and secure location whereby certain identity-related cryptographic trust elements (e.g., cryptographic keys, endpoints, identifiers, attributes, etc.) are written and from which they are referenced. A VDR mechanism includes any type of immutable or reliable data store or service and includes (but is not limited to): a blockchain, ledger, verifiable data store or mechanism, a cryptographic verification mechanism, or other mechanism for calculating the data reliability of an identity. In some cases, the trust level (e.g., trustworthiness) of presented data or credentials may be computed based on the transaction history or actions performed by an identity.

Thus, elements 100, 102, 104 and 106 are machines in a networked environment. The arrows between the machines represent interactions between the machines in the networked environment.

While most VCs are conceptually similar to other types of VCs, they are often implemented using different standards, protocols, and/or modes. Some examples of existing identity and VC protocols and formats include: W3C VC Data Model, ISO/IEC 18013-5:2021 Personal Data (mDL), OpenID for Verifiable Credentials, AnonCreds, etc. Each of these standards is focused on identity, permissions, attributes, assertions, and verifications; however, the methods and formats they use are different and usually incompatible. They also differ in whether they employ selective disclosure, which enables some credential types to assert only part of the credential's data elements or whether they must assert (provide) all of them. An additional difference is whether they facilitate Zero Knowledge Proofs (ZKP), which enable credential presentations to answer credential proof presentation requests (e.g., "Are you over 18?") without providing the actual data elements (e.g., birth date). Another difference is whether credential proofs can be answered in offline settings (e.g., when a Verifier cannot access the VDR).

The differences in today's identity and VC formats result in VCs or digital identities issued by one Issuer (e.g., national government) being incompatible or unacceptable by Verifiers in other locations (e.g., foreign governments, merchants, etc.) or digital environments. While some VC standards make efforts to include extra data or convert existing data to make one VC compatible in multiple VC governance environments, this approach is problematic due to the wide range of data and formatting employed by different VC environments. For example, if a school issues a VC to its students, those students may be unable to successfully present that VC at local merchant facilities, for national travel, etc.

Thus, there is a need to address shortcomings associated with existing digital verifiable credentials.

SUMMARY OF THE INVENTION

A non-transitory computer readable storage medium has instructions executed by a processor to host a digital verified credential exchange in network communication with different verified credential operating environments. The digital verified credential exchange has a verified credential exchange engine in network communication with user and system interfaces for interacting with a verified credential holder machine, a credential database, a verified credential operating environment operating attributes database, an exchanged verified credential database, and an exchanged verified credential status monitor. The digital verified credential exchange automatically forms a reissued digital verified credential from a first verified credential operating environment for execution in a second verified credential operating environment.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Instead of attempting to make every VC standard compatible and interoperable with every other VC standard, a new approach is presented. This new approach introduces a Verifiable Credential Exchange (VCE) system and method.

Under the VCE approach, a Holder of a VC issued in a foreign VC system may present their VC to a VC Exchange Service and request a new VC (Exchanged VC; EVC) that is interoperable and compatible with the local VC standard and format. Although the term 'exchanged' is used in this disclosure, this process includes exchanging, duplicating, and issuing different VCs, each of which can be performed for a variety of reasons.

The VCE will receive any verifiable data that can be either provided by a user (Holder), required by the originating VC (or more than one VC), or required by the target VC. The presented data will be verified and used to create an EVC that is applicable to the target/local VC standard and format and will issue it to the Holder. Upon receipt of the newly-issued EVC, the Holder may easily operate anywhere or with any service that accepts the EVC. The collection of locales, websites, services, partners, wallets, etc. that can interoperate with the EVC and the Holder of such is known as a VC Operating Environment (VCOE). VCOE's may be large or small, official or unofficial, formal or ad hoc, and may be operated by communities, businesses, colleges, governments, special interest organizations, groups, or individuals. The processes described herein encompass the exchange of VCs for EVCs regardless of the distinction between VC types, data, or operating parameters.

Figure 2:
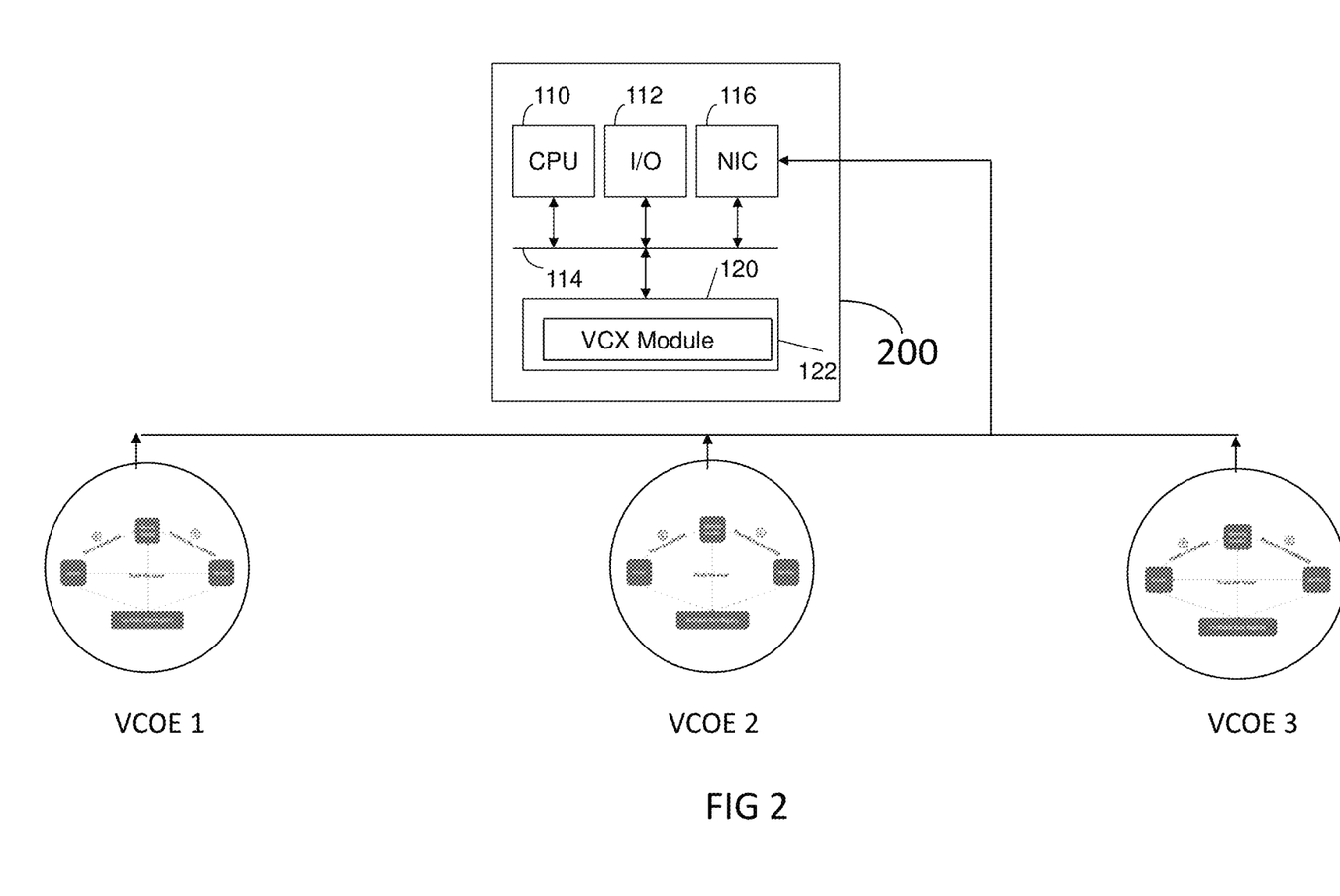
FIG. 2 illustrates a verifiable credential exchange in accordance with an embodiment of the invention.

FIG. 2 depicts a VC Exchange 200 governing VCOE1, VCOE2 and VCOE3. Each VCOE operates internally according to the VC standard it has selected and the governance model that it has established.

As discussed in connection with FIG. 1, each VCOE has elements 100, 102, 104 and 106 that are machines in a networked environment. Similarly, VC exchange 200 is a machine in network communication with VCOE1, VCOE2 and VCOE3. VC exchange 200 includes a processor 110 and input/output devices 112 connected via a bus 114. A network interface circuit 116 provides connectivity to VCOE1, VCOE2 and VCOE3. A memory 120 is also connected to bus 114. The memory 120 stores a Verified Credential Exchange (VCX) module with instructions executed by processor 110 to implement operations disclosed herein.

For the VCE 200 to perform its functions, it must interoperate with the host VCOE corresponding to the VC being presented and also the target VCOE corresponding to the VC being sought or requested. To perform these tasks, the VCE must do the following (for both the originating and target VCs/VCOEs):

1. Implement the VCOEs Paradigm (e.g., external facing APIs, protocols, formats, specifications, etc.)
2. Verify VC Presentations (e.g., communicate with the VCOE and dependent elements, such as a VDR)
3. Issue New 'Exchanged' EVCs (e.g., interface with the VCOE to issue VCs; often by operating within the VCOE as an Issuer of VCs)
4. Revoke 'Exchanged' VCs (e.g., revoke the created or Exchanged VCs when needed)

Each of the preceding steps is described in additional detail in the subsequent sections.

To be able to receive and process a presented VC that was created within a particular VCOE, the VCE must first incorporate the Operating Attributes (OA) selected by the VCOE. Example operating attributes include VC standards, communication protocols, communication endpoints, verifiable data registry, software SDK libraries (e.g., plugins), credential/key references, APIs and the like.

The OAs and process of incorporating them includes the following:

1. External Facing APIs: the VCE must implement any external APIs necessary to perform the requisite communication with the VCOE.
2. VC Standards: the VCE must implement the VC standards used by the individual VCOEs.
3. Protocols and Endpoints: the VCE must implement the methods of communication and use the VCOEs endpoint communication addresses that are to receive and send transmissions.
4. Verifiable Data Registry (VDR): each VCOE will have selected some implementation of VDR for authenticating VCs and VC presentations. There are numerous types of VDR and the VCE must be able to communicate with the VCOEs chosen VDR to verify a VC issued by the VCOE.

For some VCOEs, this integration may be performed independent of the knowledge or approval of the VCOE. However, other VCOEs may require the VCE to enroll as an official participating member of the VCOE and obtain any necessary credentials, cryptographic materials, or tokens required for participation. Implementing a VCOE's OA will enable the VCE to receive and verify a VC presentation, access any data presented through the VC presentation, and issue a new EVC in the target VCOE's format.

When a Holder presents a VC to the VCE, the Holder may provide some or all of the data contained within the original VC. Similarly, the Holder may present additional verifiable data to the VCE, which it wishes to include in the new exchanged or converted EVC. Additionally, the Holder may present multiple VCs (and their related data elements) from which the new EVC is to be created. Since the VC presentation may include elements from multiple VCs possessed by the Holder, the VCE must also implement the OAs for each of the required VCs/VCOEs.

Upon receipt of a VC presentation (potentially consisting of data elements from multiple VCs), the VCE will verify the presentation for authenticity, validity, etc. and will extract any of the presented data elements for inclusion into the resulting EVC.

To return an EVC to a requesting Holder, the VCE may employ one or more of the processes allowed by the corresponding VCOE. In many cases, the VCE may be able to communicate with an existing Issuer that is already operating within the VCOE. In this process, the VCE will create a request for a new credential that conforms to the request format of the target VCOE and contains the Holder-supplied data types. This message will be sent to the Issuer on behalf of the requesting Holder. Upon validation, payment, and eligibility requirements verification, the request will be processed by the contacted Issuer. After performing the issuance process, the newly issued VC (i.e., EVC) will be returned to the Holder either directly or via the EVC platform.

If EVC issuance requests cannot be processed by submitting them to an existing Issuer already operating within the target VCOE, then the VCE must itself become an Issuer within the target VCOE system. To do so, the VCE must conform to the Issuer-specific requirements stipulated by the VCOE's OA. This will normally require the VCE to formally enroll (and be accepted) as an Issuer in the target VCOE's environment. Often, the VCOE may need to approve the VCE as a type of Issuer that will exchange credentials from another VCOE to issue new credentials according to the local VCOE's OAs. This will often require the VCE to accept any terms and conditions necessary to become a VC Issuer for the target VCOE.

When a VC is presented, the accompanying data often contains a validity period, which can be a fixed expiration date, a specified timeframe, or an unlimited or indefinite timeframe. The VCE may also impose a shorter validity period for a variety of reasons (e.g., original or target VCOE requirements, fees for valid timeframes, etc.). Since the new EVC essentially needs to mirror the originally presented VC, the VCE will need to also issue the new VC with the appropriate expiration date.

In addition to simply setting the expiration attributes in the new VC, the VCE may also monitor the originally presented VC and the hosting VCOE for a change in validity status. For example, a driver's license VC issued with a 5-year validity period may be revoked early by the hosting VCOE as a penalty for a driving offense. Given that early revocation situations may exist, the VCE should periodically re-validate the validity status of the original presented VC. This can be done by the VCE checking the original VCOE source or if the original VCOE's OAs facilitate, the VCE can receive a revocation notice from the original VCOE. If the originally presented VC is found to be expired or revoked, then the VCE will need to revoke or expire the EVC.

Figure 3:
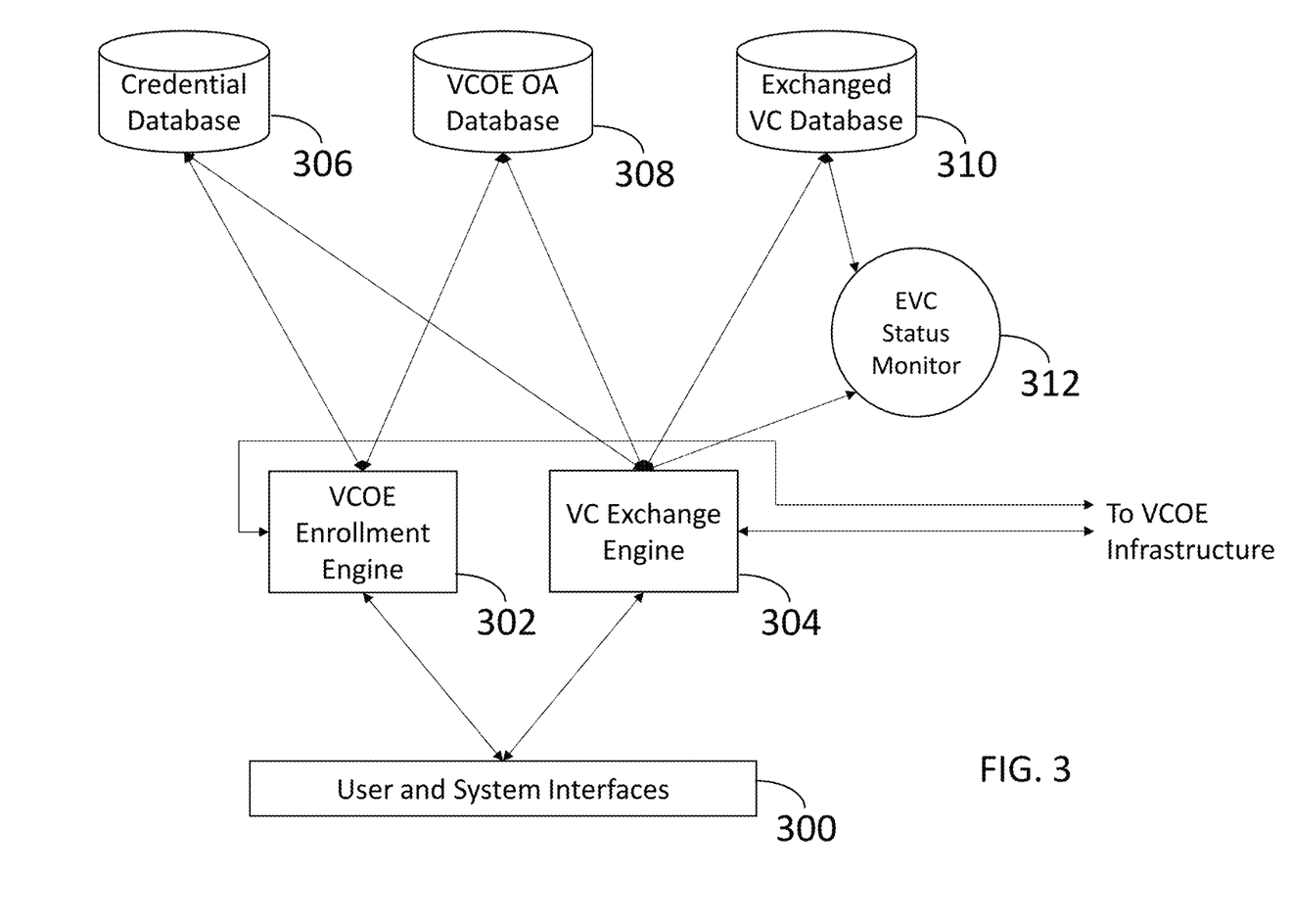
FIG. 3 illustrates verifiable credential exchange machine interactions with other networked devices.

The VCE is a system and method for bridging between VCOEs so that a Holder can exchange a VC issued by one VCOE for one issued in another VCOE. The major elements are depicted in FIG. 3, which has the following system elements.

1. User and System Interfaces 300: this element includes human computer interaction routines and methods as well as the routines and methods (e.g., API) for programmatic interactions performed by apps or other system processes.
2. VCOE Enrollment Engine 302: this element provides the processing routines for adding and integrating a new VCOE into the VCE. To integrate a new VCOE requires the Operating Attributes (OA) corresponding to the target VCOE. Adding the OA requires inputting the OA data, cryptographic data, source code implementing the functionality described by the OA including protocols, standards (implemented in software; SDK), executable plugins, etc. For each VCOE, the OA data and executable software are stored in the VCOE OA Database 308.
3. VC Exchange Engine 304: includes all the executable software necessary to receive and process a VC Exchange Request received from VC Holders. It also pulls the OA data and routines from the VCOE OA Database 308, so that it can verify corresponding VC presentations and request/issue a new EVC from the target VCOE. Once created, it returns the new EVC to the requesting Holder and records the transaction in the Exchanged VC Database.
4. Credential Database 306: to interface with Holder users and remote VCOEs, the VCE maintains and employs many different VCs and other credentials necessary to interface with the VCOE systems and operate the VCE environment.
5. VCOE OA Database 308: contains the OA data and executable software (e.g., SDKs, plugins, etc.) necessary to interact with each implemented VCOE.
6. Exchanged VC Database 310: a record of each VC exchanged and the EVC it is exchanged for is kept for logging, status monitoring, and revocation purposes.
7. EVC Status Monitor 312: since an EVC should not outlast the original VC, this process monitors the original VC in its corresponding VCOE to verify that it is still valid and has not been revoked, expired, or modified. If an EVC is found to have expired or have been revoked, then the EVC Status Monitor instructs the VC Exchange engine to also revoke the EVC.

To support a new type or source of VC, it is necessary to integrate the corresponding VCOE into the VCE. This may be done manually, semi-automated (with a combination of manual and automated processing), or via fully automated processing. In one embodiment, to enroll a VCOE, the following steps are performed:

1. VCOE's OA is presented to the System Interface 300.
2. VCOE's OA is sent to the VCOE Enrollment Engine 302. The VCOE Enrollment Engine decodes the OA information and performs the necessary enrollment procedures with the VCOE itself.
3. The cryptographic material specified in the OA is stored in the Credential Database 306.
4. The OA material, including the executable software, SDKs, plugins, etc. are stored in the VCOE OA Database 308.

The OA material added during the enrollment process will be later used by the VC Exchange Engine to access the VCOEs. The VC Exchange Engine 304 accesses the VCOE to verify a VC presentation and also to create/issue a new EVC in the target VCOE.

When a VC Holder requests an EVC, two preconditions must have been previously met. First, the VCOE(s) corresponding to the presented VC must have previously been enrolled using the previously described process. Second, the target or requested VC format must also have had the corresponding VCOE enrolled in the VCE. If either of these conditions has not been met, then the EVC request process will not succeed. The process steps and their explanations are enumerated as follows:

1. VC Holder creates an EVC Request via user and system interfaces 300. The EVC Request includes a VC presentation and a designation of which VCOE from which they wish to receive an EVC.
2. The EVC Request is passed to the VC Exchange Engine 304, which decodes the request.
3. The VC Exchange Engine 304 retrieves from the VCOE OA database 308 information necessary for communicating with the VCOE. During this process the VC presentation is verified, and the data presented is extracted.
4. To connect as a VC Issuer for the target VCOE, the VC Exchange Engine 304 retrieves the previously obtained VC Issuer credentials (for the target VCOE) from the Credential Database 306.
5. The VC Exchange Engine 304 prepares a VC issuance request using the credentials and protocols of the target VCOE. It then submits the VC issuance request to the target VCOE and receives the VC issuance response with the newly issued VC.
6. Having created the new EVC, the VC Exchange Engine 304 logs the EVC request issuance transaction in the Exchanged VC Database 310. The purpose of this record is to maintain a transaction log and to enable the later EVC Status Monitor process that will monitor for expired or revoked VCs and similarly revoke the issued EVCs when necessary.
7. Once the EVC creation process has been created, the EVC is returned to the requesting Holder via the user and system interfaces 300.

With the newly received EVC, the Holder may use it within the corresponding VC environment with Verifiers that accept this credential type. As an example, a visitor to a foreign country will have submitted a VC presentation to the VCE, requested a locally accepted VC, and received the EVC for use within the local country. The new EVC will contain any data from the original VC that applies to the schema of the requested VC type (EVC). The EVC will have either the same VC expiration date as the original credential, an earlier expiration date mandated by the local country, or some other earlier time determined by some other means.

Since the EVCs must not persist beyond the validity date of the original VC or must adhere to an earlier expiration date, the desired date is incorporated into the EVC upon issuance. Additionally, the original VC may be revoked (by the VCOE) prior to the stated expiration date. As an example, a Holder may have a VC revoked for non-payment of a required subscription, the completion of a task for which the VC was issued, or some other revocation criteria.

The following characterizes the process steps for monitoring the validity status of the original VC and performing a revocation process of the EVC, if necessary. In this process, the EVC Status Monitor operates independently from other VCE system processes. The following process steps describe the actions of the EVC Status Monitor:

1) The EVC Status Monitor 312 is the coordinating process ensuring that EVCs only persist as long as the original VC has not been revoked. It runs continually.
2) The EVC Status Monitor 312 queries the Exchanged VC Database 310 for the next EVC and retrieves its transaction information.
3) The EVC Status Monitor 312 requests that the VC Exchange Engine (which connects to the VCOE) 304 perform a status check on the original VC. This status is returned to the EVC Status Monitor 312 for evaluation.
4) The EVC Status Monitor 312 checks the validity and revocation statuses of the original VC. If the VC has been revoked or expired, it revokes the EVC and records the status update in the Exchanged VC Database 310.
5) When a EVC has been revoked, it instructs the VC Exchange Engine 304 to report the revocation to the EVC Holder.
6) The VC Exchange Engine reports a revoked EVC to the corresponding Holder via user and system interfaces 300.

In an alternative embodiment, the EVC Status Monitor 312 may receive incoming communications from the original VC presentation's VCOE(s). Such incoming communications may include notifications or other instructions to the VCE intended to convey notice that the original VC/VCOEs have been revoked, are pending revocation, or are suspended in some way.

Figure 8:
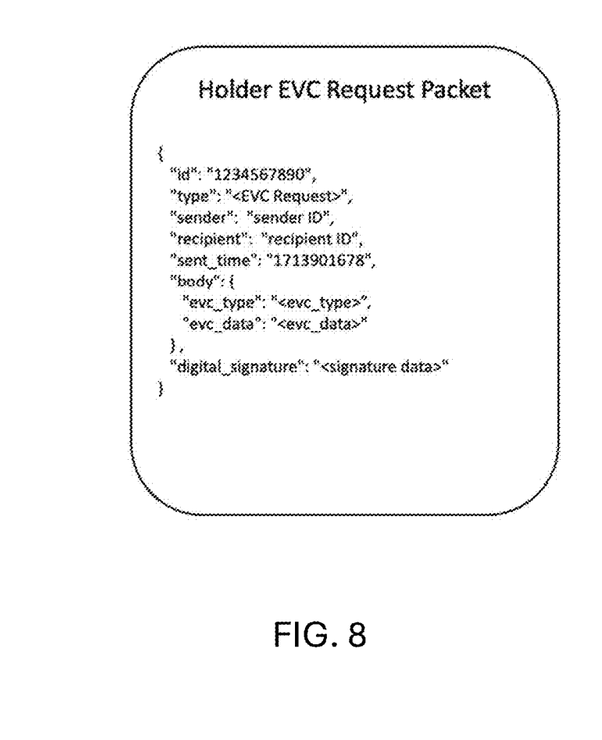
FIG. 8 illustrates a Holder EVC Request Packet utilized in accordance with an embodiment of the invention.
Figure 9:
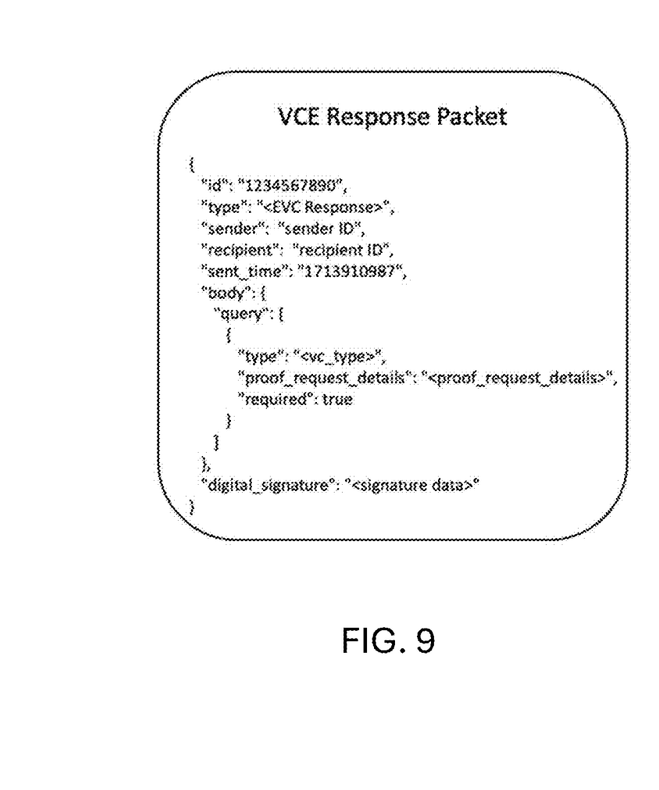
FIG. 9 illustrates a VCE Response Packet utilized in accordance with an embodiment of the invention.

When the Holder requests an EVC, they will send an EVC Request Packet to the VCE. This packet will enumerate the type of EVC that they are requesting, which will also provide any required data, identifiers, signatures, etc. Upon receiving the EVC Request Packet, the VCE will prepare a VCE Response Packet that contains both logistical and cryptographic material request information to convey a challenge-response process to the requesting Holder. While the actual format and data elements conveyed will differ based on the VC types used and the systems implemented, the general format for a Holder EVC Request Packet and VCE Response Packet follow. FIG. 8 illustrates a Holder EVC Request Packet utilized in accordance with an embodiment of the invention. FIG. 9 illustrates a VCE Response Packet utilized in accordance with an embodiment of the invention.

Figure 10:
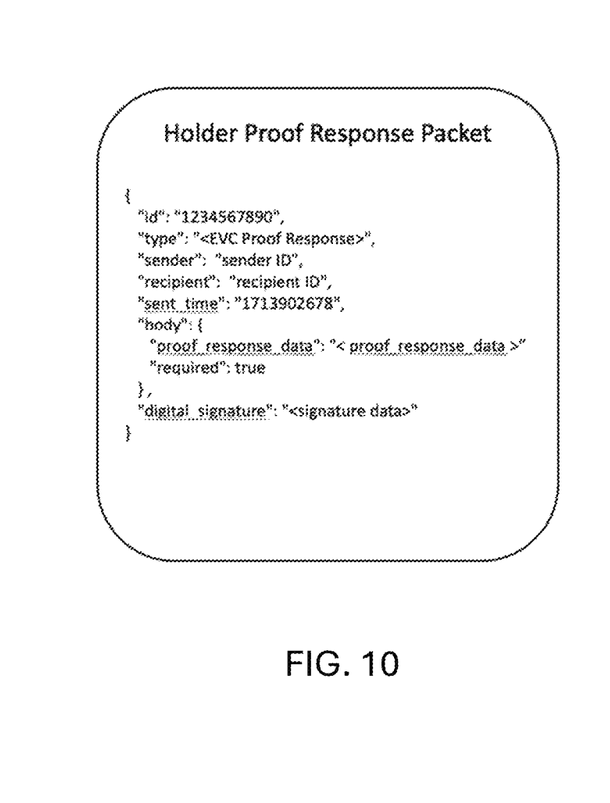
FIG. 10 illustrates a Holder Proof Response Packet utilized in accordance with an embodiment of the invention.
Figure 11:
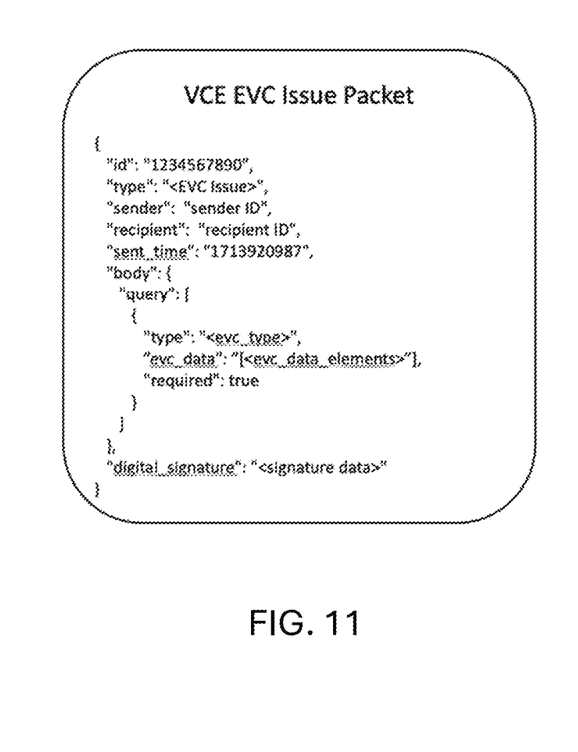
FIG. 11 illustrates a VCE EVC Issue Packet utilized in accordance with an embodiment of the invention.

When the Holder computes a VC presentation proof response, it will contain specific logistical and cryptographic information based on the VC type and processing system used. When an EVC is issued, it will be returned to the requestor and contain specific logistical and cryptographic information based on the VC type and exchange protocols used. Exemplary Holder Proof Response Packet and VCE EVC Issue Packet follow. FIG. 10 illustrates a Holder Proof Response Packet utilized in accordance with an embodiment of the invention. FIG. 11 illustrates a VCE EVC Issue Packet utilized in accordance with an embodiment of the invention.

In this process, the Holder requests that the VCE create a new EVC that corresponds to the identity information and data contained within the VC Presentation that the Holder presents. In this embodiment, the process is simple.

1. Holder Requests a new EVC:
   a. Holder creates a VC presentation with the data and VC(s) that they desire to exchange for an EVC.
   b. Holder sends the EVC request (with the VC presentation) to the VCE. That is, a holder interacts with the user and system interfaces 300 to access the VC exchange engine, which accesses VCOE infrastructure.
2. VCE Returns Request:
   a. VCE processes the EVC request
   b. VCE validates all data submitted as part of the VC presentation c. If the VC presentation is valid, then the VCE creates and issues a new EVC with the VCOE that the Holder requested d. EVC is returned to the Holder via the user and system interfaces 300.

The following steps describe an Expanded EVC Request from Holder.

1. Holder requests an EVC from the VCE
   a. Holder's request enumerates the source VC and the desired target VC via the user and system interfaces 300.
2. VCE process the Holder's request
   a. VC Exchange Engine 304 verifies that the source VC and the target VC have been previously enrolled in the VCE
   b. If the source and target VCs have been enrolled, the VCE responds with a VC proof request returned to the Holder via user and system interfaces 300.
3. Holder processes the VCE's request
   a. Verifies the VC proof request
   b. Prepares a VC proof response
   c. Transmits the proof response to the VCE via user and system interfaces 300
4. VCE Returns Request:
   a. VCE processes the EVC request
   b. VCE validates all data submitted as part of the VC presentation
   c. If the VC presentation is valid, then the VCE creates and issues a new EVC with the VCOE that the Holder requested (alternatively, the VCE may request that the new EVC be issued by an existing Issuer already operating within the target EVC's VCOE).
   d. EVC is returned to the Holder via the user and system interfaces 300.

When credentials are exchanged, the new credentials may be stored in the Holders main wallet alongside the original credentials. This is possible since the new credential (EVC) will have a different ID value. However, this could also be confusing to users wondering which credential to use in each situation. To simplify this confusion, there are a few changes that should be made to the Holder Wallet to better support interactions with the Verifiable Credential Exchange.

Figure 4:
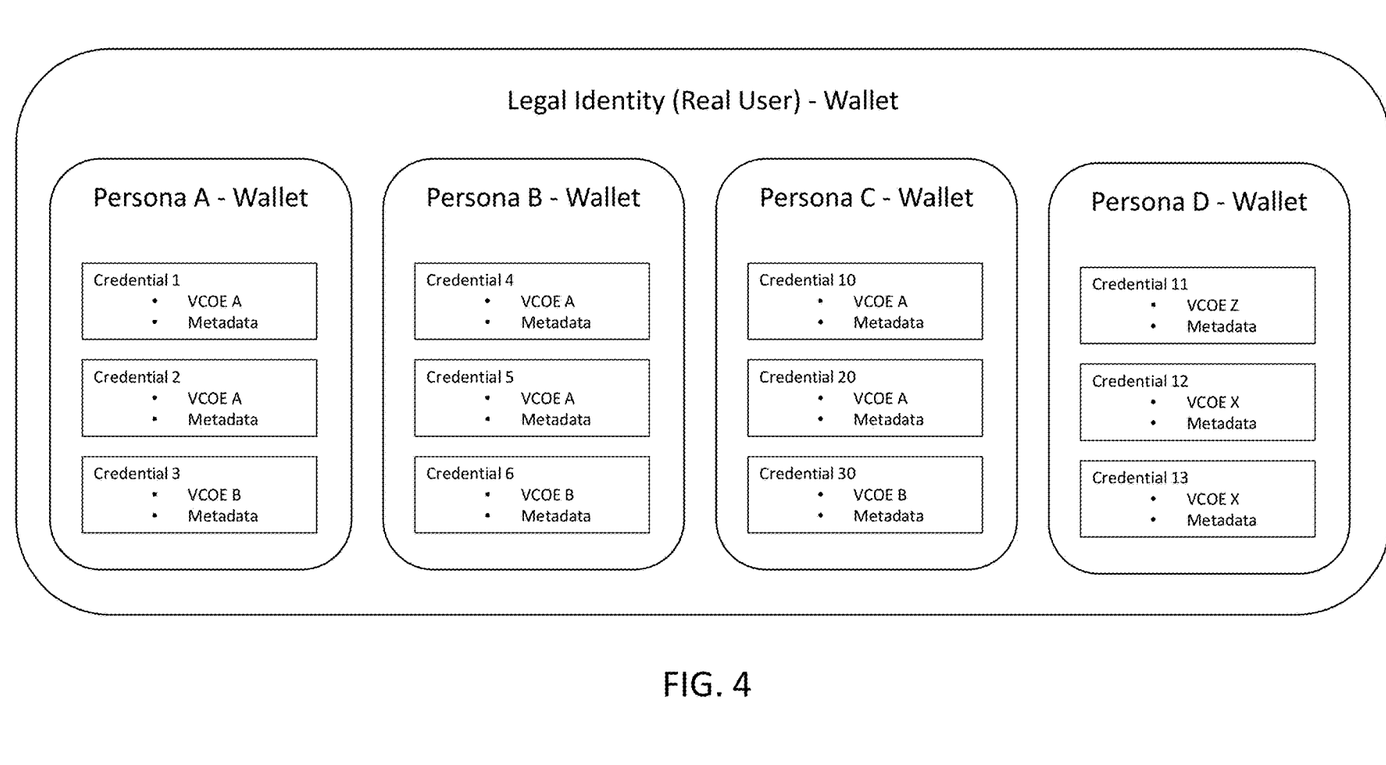
FIG. 4 illustrates a digital wallet utilized in accordance with an embodiment of the invention.

The Holder Wallet needs a way to view each VCOE that they have credentials for and select which is the active VCOE (persona). FIG. 4 depicts a credential wallet held by a real user (Legal Identity) that maintains multiple Personas that each have several credentials. In this example, credentials are listed individually in each Persona's wallet.

Figure 5:
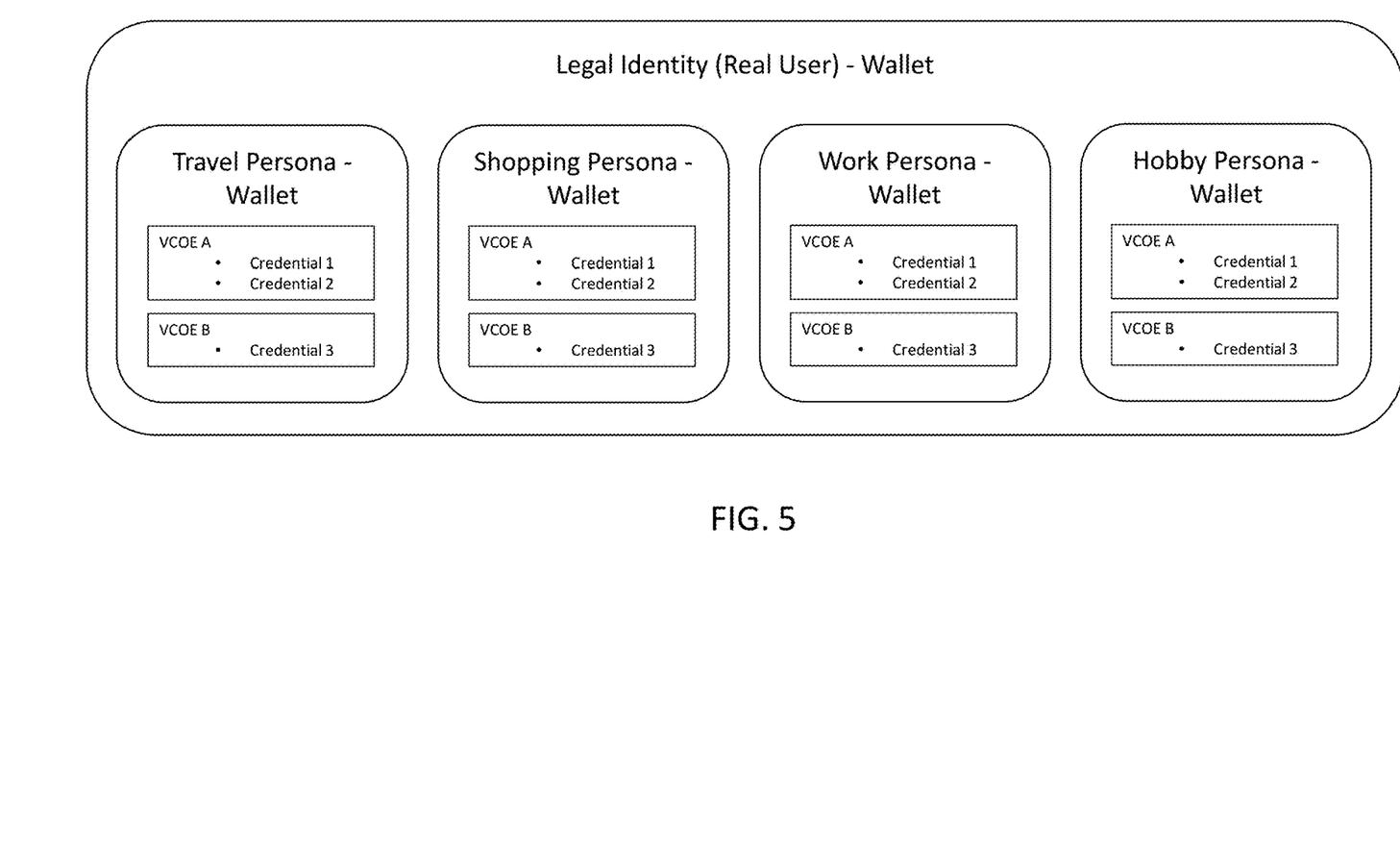
FIG. 5 illustrates another digital wallet utilized in accordance with an embodiment of the invention.

FIG. 5 depicts a real user's wallet with multiple personas. In this example, the Personas are shown with credentials ordered by the corresponding VCOE.

Figure 6:
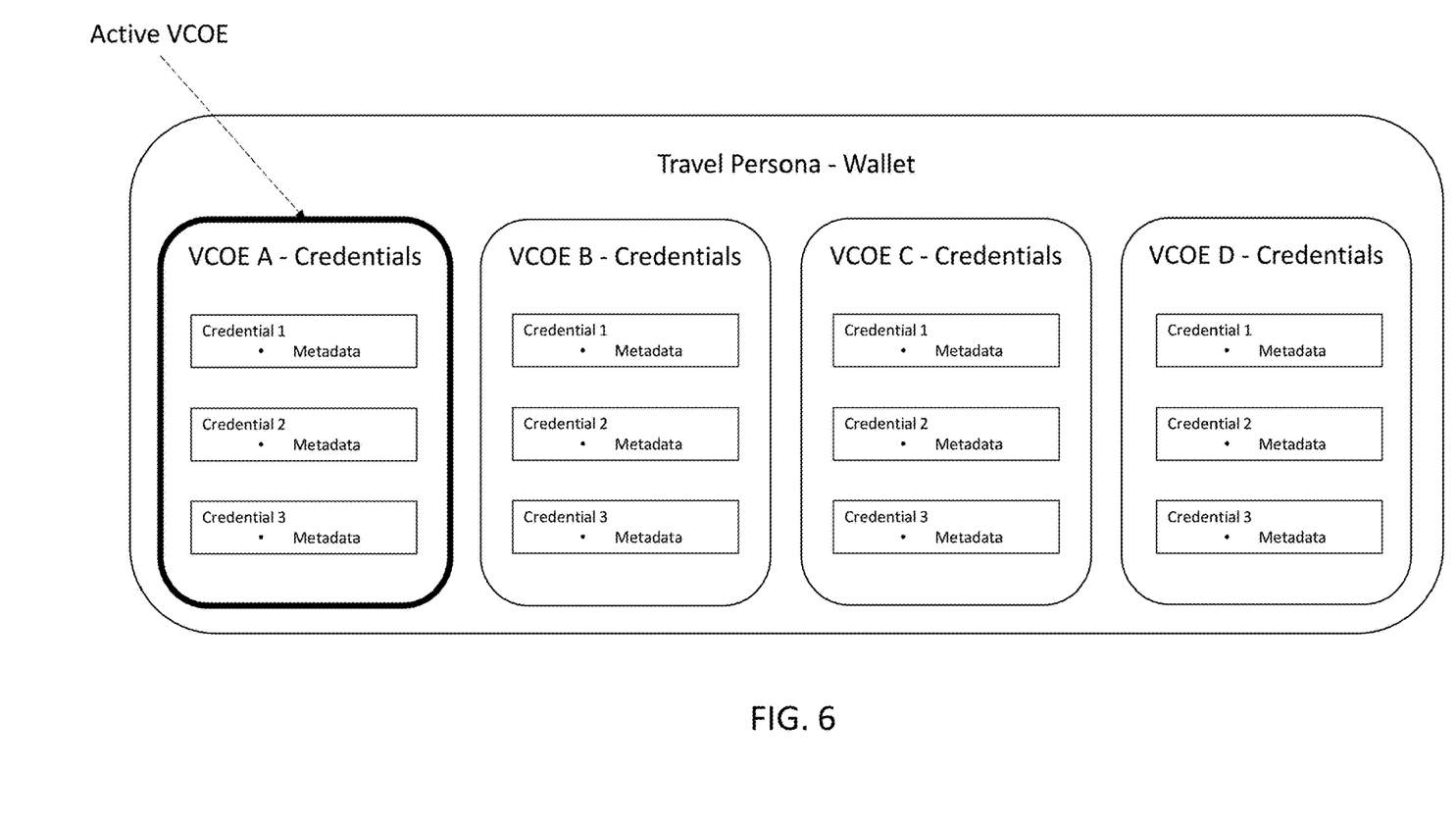
FIG. 6 illustrates another digital wallet utilized in accordance with an embodiment of the invention.

In travel use cases, a Holder will travel from their home VCOE to a foreign VCOE. In this case, the wallet could automatically detect the new location and offer the new locale's VCOE as the highlighted VCOE, which is depicted in FIG. 6. In another embodiment, this could be a manual process through which the Holder of the Wallet actively selects their active persona and VCOE. When a user is operating in a new locale/VCOE, they will often change personas. When the user selects a new persona, the active VCOE could similarly be selected either manually or automatically.

Suppose the user needs to prove identity information. The presentation proof request will request the information from the Wallet. The Wallet needs to know the active persona to present proofs from the VCs that are active, and not for example, VCs from their home persona.

When a Holder is travelling to a new VCOE jurisdiction, it is convenient for the Holder to quickly determine which VCs are available in the new VCOE, and which credentials from the Holder's current VCOE may be converted into EVCs that can be used in the new VCOE VCs. This type of listing of credential exchange options is referred to as a VCOE Credential Marketplace.

Figure 7:
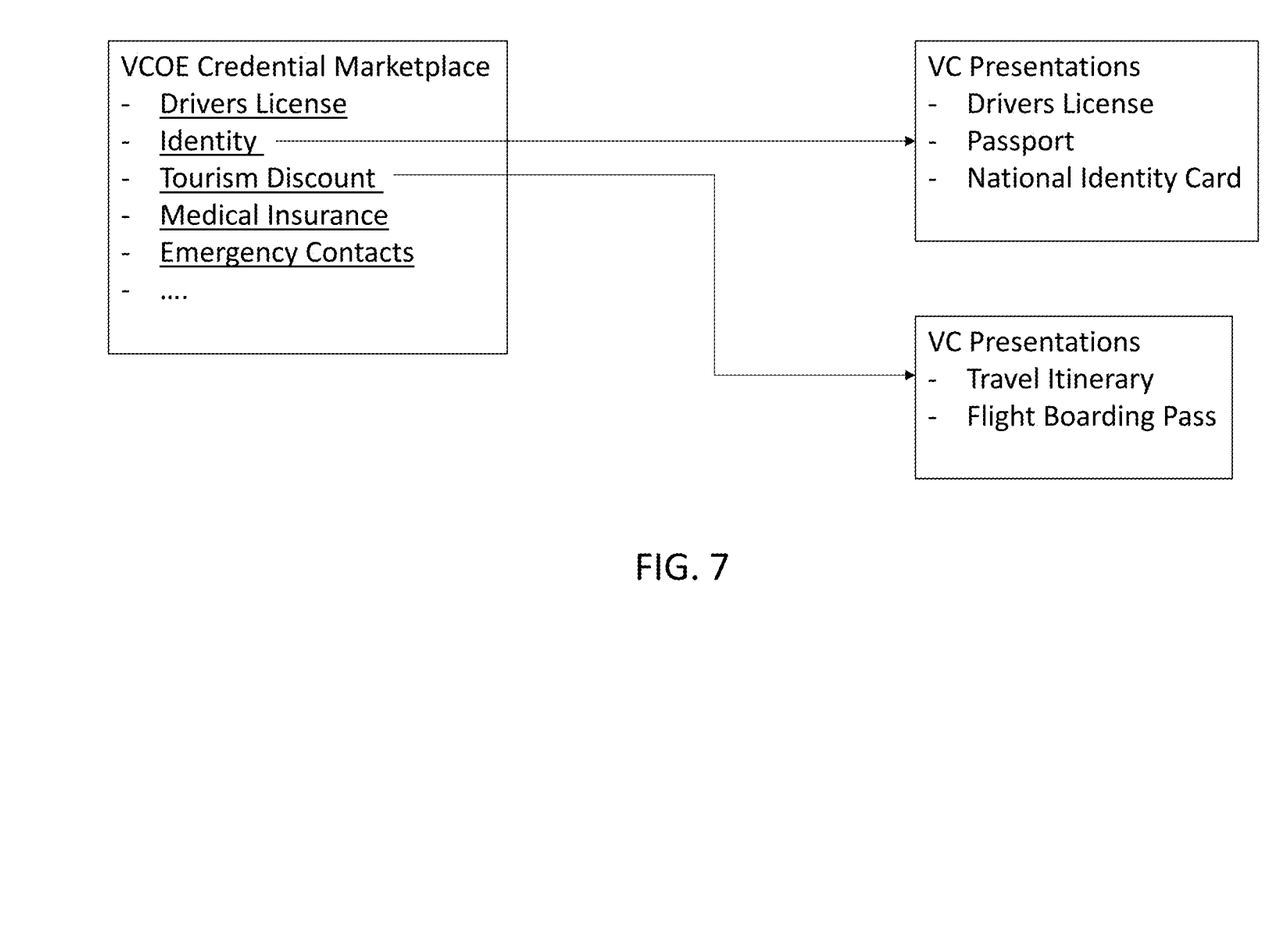
FIG. 7 illustrates a Virtual Credential Operating Environment (VCOE) marketplace utilized in accordance with an embodiment of the invention.

FIG. 7 shows an example VCOE Credential Marketplace. On the left are the VCs available within the current VCOE. Connected to those are the VCOE's VC presentations required to obtain a VC from the credential marketplace. FIG. 7 depicts this relationship, which can include many different credential types ranging from official legal identifications to situational, marketing eligibility credentials that may employ privacy-preserving constructs, such as zero knowledge proofs, to facilitate commercial transactions in new physical or virtual locations.

Holder Wallets can actively enable Holders to easily discover VCOE Credential Marketplaces and the opportunities they contain. For example:

Manual Browsing: user can manually browse a VCOE's offerings from within the wallet app itself or by reviewing external linked connections for additional offerings from the target VCOE.

Geo-Location: the wallet may automatically discover and present to a user offerings available from the target VCOEs through geo-location mapping. For example, when the user lands in a different country, the Holder Wallet notifies the user of potential new VCOE Credential Marketplaces of interest.

Zero Knowledge Requests: wallet users may select some of their available in-wallet credentials and ask the wallet to discover exchange opportunities available from the target VCOE that require the in-wallet credentials they already have. These requests should use zero knowledge proof like mechanisms to request potential exchange options without divulging information about the Holder of the credentials.

Partial Zero Knowledge Requests: similar to the Zero Knowledge Requests, a Holder can use their wallet app to query possible exchange possibilities where the Holder only possesses some of the necessary credentials required for exchange. For example, the Holder's app may essentially say, "What can I exchange for these?" and the VCOE Marketplace may respond with "You can get these" and "If you also provide credential X, then you can also exchange for these: A, B, C".

This credential marketplace would be more than visual, as it would enable the Holder to very simply request and present VCs. If the user selects a VCOE Identity credential as shown in FIG. 7, the wallet immediately presents to the user potential VC presentations that could satisfy requesting the VCOE Identity credential by reviewing the required VC list. If the user didn't have the VCs in their wallet to satisfy the presentations required, the Credential Marketplace may even indicate where to obtain the required VCs.

In many embodiments, the marketplace contains a variety of EVC entries that Holders select from. Each EVC entry specifies the EVC type, the required VCs, issuance processes, data, authorizations, usage environments, time durations, etc. that are pertinent to each EVC. In these embodiments, Holders initiate a request based on the EVCs sought. In this embodiment, Holders request EVCs that they are seeking.

In other embodiments, the credential marketplace could solicit visiting Holders to offer a variety of EVC types that are available for exchange or purchase. In one embodiment, a Holder could present the VC types they possess (using privacy preserving processes) to the marketplace. Upon evaluating the VC types and other data presented by the Holder, the marketplace recommends a variety of EVC options that the Holder selects from. In this embodiment, the Holder approaches the marketplace, which in turn prepares and presents EVC options.

While the scenario traveling from a home VCOE to a foreign VCOE is the main use case presented, other scenarios will also benefit from this process. In other embodiments, traveling from one VCOE to another is not limited to the exchange of legal VCs such as a driver's license or passport. In another embodiment, commercial travel deals may be requested or offered from the marketplace. In another embodiment, a VCOE set may be requested and received for use in a specific location such as an amusement park or shopping venue. In another embodiment, VCs may be exchanged for EVCs in online gaming or reality environments. In another embodiment, this process may be used for commercial loyalty card solutions.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   host a digital verified credential exchange in network communication with different verified credential operating environments;
   a verified credential exchange engine within the digital verified credential exchange, the verified credential exchange engine being in network communication with user and system interfaces for interacting with a verified credential holder machine,
   a credential database,
   a verified credential operating environment operating attributes database,
   an exchanged verified credential database, and
   an exchanged verified credential status monitor;
   wherein the digital verified credential exchange automatically forms a reissued digital verified credential from a first verified credential operating environment for execution in a second verified credential operating environment.

2. The non-transitory computer readable storage medium of claim 1 wherein the reissued digital verified credential maintains parameters of the first verified credential operating environment.

3. The non-transitory computer readable storage medium of claim 1 wherein the reissued digital verified credential maintains parameters of the first verified credential operating environment reformatted for the second verified credential operating environment.

4. The non-transitory computer readable storage medium of claim 1 further comprising instructions executed by the processor to automatically form a second reissued digital verified credential for execution in a third verified credential operating environment.

5. The non-transitory computer readable storage medium of claim 1 further comprising instructions executed by the processor to monitor for expiration of a digital verified credential in the different verified credential operating environments.

6. The non-transitory computer readable storage medium of claim 1 further comprising instructions executed by the processor to operate as an issuer and verifier of digital verifiable credentials in the different verified credential operating environments.

7. The non-transitory computer readable storage medium of claim 1 further comprising instructions executed by the processor to present a user with available verifiable credentials in a new physical location or operating environment.

8. The non-transitory computer readable storage medium of claim 1 further comprising instructions executed by the processor to process legal verifiable credentials.

9. The non-transitory computer readable storage medium of claim 1 further comprising instructions executed by the processor to process government verifiable credentials.

10. The non-transitory computer readable storage medium of claim 1 further comprising instructions executed by the processor to process private verifiable credentials.

11. The non-transitory computer readable storage medium of claim 1 further comprising instructions executed by the processor to process commercial verifiable credentials.

* * * * *